United States Patent
Meheux et al.

(10) Patent No.: US 11,199,015 B2
(45) Date of Patent: Dec. 14, 2021

(54) METHOD FOR FILTERING WATER IN A BASIN, FILTRATION UNIT FOR IMPLEMENTING SAID METHOD AND CENTRIFUGAL HYDRAULIC PUMP ASSOCIATED WITH SAID FILTRATION UNIT

(71) Applicant: GROUPE WATERAIR, Seppois le Bas (FR)

(72) Inventors: Luc Meheux, Delle (FR); Thierry Steinbauer, Giromagny (FR)

(73) Assignee: GROUPE WATERAIR, Seppois-le-Bas (FR)

( * ) Notice: Subject to any disclaimer, the term of this patent is extended or adjusted under 35 U.S.C. 154(b) by 0 days.

(21) Appl. No.: 16/954,052

(22) PCT Filed: Dec. 6, 2018

(86) PCT No.: PCT/EP2018/083752
§ 371 (c)(1),
(2) Date: Jun. 15, 2020

(87) PCT Pub. No.: WO2019/121031
PCT Pub. Date: Jun. 27, 2019

(65) Prior Publication Data
US 2021/0079676 A1 Mar. 18, 2021

(30) Foreign Application Priority Data
Dec. 22, 2017 (FR) .................................... 1763082

(51) Int. Cl.
*E04H 4/12* (2006.01)
*B01D 35/02* (2006.01)
(Continued)

(52) U.S. Cl.
CPC ......... *E04H 4/1272* (2013.01); *B01D 35/027* (2013.01); *B01D 35/26* (2013.01);
(Continued)

(58) Field of Classification Search
CPC ... E04H 4/1272; E04H 4/1245; E04H 4/1209; B01D 35/027; B01D 35/26; C02F 1/001;
(Continued)

(56) References Cited

U.S. PATENT DOCUMENTS 7,252,761 B2 * 8/2007 Lamberts Van Assche ................. B01D 24/14
210/167.12
7,407,575 B2 * 8/2008 Braun .................. E04H 4/1272
210/167.12
(Continued)

FOREIGN PATENT DOCUMENTS

DE 202005021216 U1 6/2007
EP 1632622 A1 3/2006
(Continued)

OTHER PUBLICATIONS

International Search Report issued in PCT Patent Application No. PCT/EP2018/083752 dated Mar. 8, 2019.

*Primary Examiner* — Fred Prince
(74) *Attorney, Agent, or Firm* — Marshall, Gerstein & Borun LLP

(57) ABSTRACT

The present invention relates to a filtration unit for filtering the water in a pool or basin, in particular a swimming pool, said unit being mounted behind a wall of said pool, and communicating with said pool via a suction intake (3, 6) and via a delivery orifice to generate a forced flow of water from and back into the pool through a filtration tank and through a suction column by means of centrifugal hydraulic pump. The centrifugal hydraulic pump has an electric motor coupled to a centrifugal turbine housed in a pump body. The (Continued)

electric motor is a sealed, brushless, autonomously controlled motor that is powered at very low voltage and that may advantageously be immersed inside the filtration unit below the level of the water contained in said pool, thereby enabling said motor to be cooled and sound-proofed naturally by the forced flow of the water from the pool, thereby forming a filtration unit and a pool that have low energy consumption.

29 Claims, 4 Drawing Sheets

(51) Int. Cl.
*C02F 1/00* (2006.01)
*F04D 13/08* (2006.01)
*F04D 15/00* (2006.01)
*F04D 29/42* (2006.01)
*F04D 29/66* (2006.01)
*B01D 35/027* (2006.01)
*B01D 35/26* (2006.01)
*C02F 103/42* (2006.01)

(52) U.S. Cl.
CPC .............. *C02F 1/001* (2013.01); *F04D 13/08* (2013.01); *F04D 15/00* (2013.01); *F04D 29/426* (2013.01); *F04D 29/669* (2013.01); *C02F 2103/42* (2013.01); *C02F 2201/004* (2013.01); *C02F 2301/026* (2013.01)

(58) Field of Classification Search
CPC ............ C02F 2103/42; C02F 2201/004; C02F 2301/026; F04D 13/08; F04D 15/00; F04D 29/426; F04D 29/669; F04D 13/0606
USPC .. 210/776, 805, 167.1, 167.19, 416.1, 416.2
See application file for complete search history.

(56) References Cited

U.S. PATENT DOCUMENTS

| 9,885,196 B2 * | 2/2018 | Hayes ..................... B04C 9/00 |
| 2005/0092668 A1 * | 5/2005 | Desjoyaux ............ B01D 35/26 210/167.19 |
| 2017/0218977 A1 | 8/2017 | Sinico et al. |

FOREIGN PATENT DOCUMENTS

| FR | 1533814 A | 7/1968 |
| FR | 2398435 A7 | 2/1979 |
| FR | 2789599 A1 | 8/2000 |
| FR | 2848470 A1 | 6/2004 |
| WO | WO-03/028847 A1 | 4/2003 |
| WO | WO-2012/021935 A1 | 2/2012 |

* cited by examiner

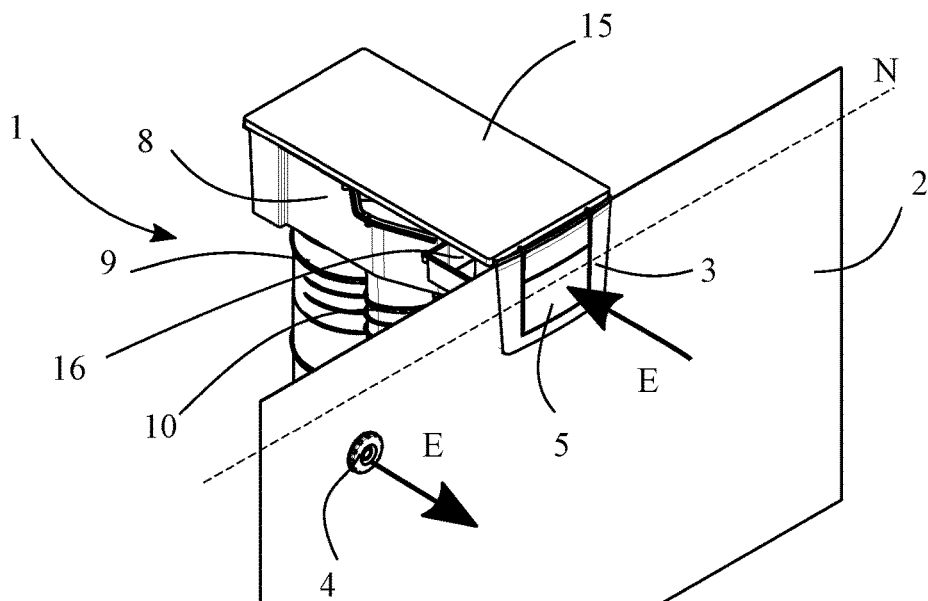

METHOD FOR FILTERING WATER IN A BASIN, FILTRATION UNIT FOR IMPLEMENTING SAID METHOD AND CENTRIFUGAL HYDRAULIC PUMP ASSOCIATED WITH SAID FILTRATION UNIT

TECHNICAL FIELD

The present invention relates to a filtration method for filtering water in a pool, in particular a swimming pool, in which method a flow of water is generated so that water is caused to flow from and back into the pool through at least one filtration unit having at least one suction intake and at least one delivery orifice, said filtration unit having a centrifugal hydraulic pump and at least one filtration device, said centrifugal hydraulic pump having an electric motor coupled to a centrifugal turbine housed in a pump body, and said electric motor being a sealed, brushless, and autonomously controlled motor fed with direct current (DC) at a very low voltage lying of in the range 12 volts (V) to 30 V.

The invention also relates to a filtration unit making it possible to implement said filtration method, and further relates to a centrifugal hydraulic pump associated with said filtration unit, and to a pool provided with said filtration unit.

BACKGROUND

Various models of filtration unit exists for pools or basins, and in particular for swimming pools, including the model described in the Applicant's Publication WO 03/028847 A1, that model of filtration unit making it possible to clean the water in a pool in continuous mode or in discontinuous mode depending on the conditions of use of the pool by sucking water from the surface of the pool through a filtration device, and by delivering it back into the pool in the vicinity of the zone from which it was sucked. That filtration unit offers the advantage of being adjoining to a wall of the pool, thereby making it possible advantageously to reduce the lengths of the ducts and pipes of the hydraulic circuit, thereby limiting the head losses and increasing the effectiveness of the filtration. In the solution disclosed, the filtration unit has a centrifugal turbine hydraulic pump that procures a suction effect and that is mounted in the filtration unit downstream from the filter medium so as to suck water from the surface of the pool through the filter medium, by negative pressure. That centrifugal hydraulic pump is preferably disposed on a vertical axis in the filtration unit, and it is provided with an electric motor coupled to the centrifugal turbine, which turbine is also preferably disposed on a vertical axis, said electric motor being disposed above the level of the water of the pool. That configuration in which the electric motor is out of the water is to be found in certain hydraulic pumps that are coupled to or incorporated into a filtration unit for filtering water in a pool, when the electric motor is not designed for being immersed, i.e. is not submersible. Consequently, this out-of-the-water configuration brings implementation constraints firstly making it necessary for the electric motor, its transmission shaft and its electrical portions to be protected from any splashes of water by means of one or more specific cowlings, and secondly making it necessary for the electric motor out of the water to be cooled either via a specific hydraulic circuit connected as a branch circuit off the main hydraulic circuit, or via an air-flow cooling system operating by means of a fan coupled to the shaft of the motor, and also brings constraints regarding the turbine and its drive shaft since the turbine must be positioned far enough away from the motor to be situated under the water level in order to be immersed and under load. Such out-of-water installation also requires specific arrangements related to: keeping people safe due to a 230 V alternating current (AC) power supply for the electric motor close to the pool; to mitigating lack of compactness and displeasing appearance given that the filtration unit protrudes above the level of the water and above the level of the deck or patio around the pool; to mitigating noise generated by operation of the electric motor, which, when it is air-cooled, can be as high as 70 decibels (dB), corresponding to an "overall emergence" which can reach 13 dB; and to coping with limited reliability and with a shorter life that are due to the chlorinated and/or salty ambient environment in which the electric motor has to operate that causes premature ageing of the bearings, corrosion of the metal parts, a risk of short-circuiting in the windings of the motor, etc. Furthermore, the electric motor used for that application is generally an asynchronous, single-phase motor that is fed with AC, and that is of relatively high power, approximately in the range 500 watts (W) to 600 W, for a relatively low efficiency, lying in the range 45% to 70%, depending on the size of the motor. That type of electric motor therefore consumes large quantities of energy for efficiencies that are mediocre in terms of electrical-to-mechanical conversion. Furthermore, its speed of rotation is relatively high, and of the order of 2900 revolutions per minute (rpm) at an electrical frequency of 50 hertz (Hz), which has an impact on the efficiency of the mechanical to hydraulic conversion, given that speed is an enemy of efficiency, with, in addition, risks of cavitation.

Other hydraulic pumps exist for filtering the water in a pool, such as those disclosed in the Applicant's Publication FR 2 789 599 A1 and in Publications FR 2 848 470 A1, EP 1 632 622 A1 and WO 2012/021935 A1, those pumps being mounted in the lower portion of the filtration unit, i.e. below the filter medium or filter media, and consequently being fully immersed and therefore silent. However, certain pumps are equipped with propellers or propulsion-effect impellers and the technology of the motors equipping such pumps is not always adapted to use immersed in a chlorinated and/or salty environment. Thus, their life spans are limited since the metal portions of the motors corrode quickly, requiring frequent cleaning and maintenance work on such pumps. In addition, access to such pumps is very complicated and involves disassembling the entire filtration unit to perform the cleaning and maintenance operations, and also to perform the disassembly operations for winterizing. Furthermore, propeller pumps do not have sufficient dynamic head, so that they lose efficiency whenever the filter media starts to clog up, thereby causing the flow rate to decrease and the power of such motors to fall. Therefore, those solutions are not optimum.

Publications FR 1 533 814 A, US 2017/218977 A1 and FR 2 398 435 A7 propose hydraulic pumps that may or may not operate while immersed, and having their motors partially sealed off from the fluid that is being caused to flow. Unfortunately, the isolation solutions disclosed are insufficient for the field of application of the invention, and do not make it possible to overcome the risks of corrosion, in particular.

Also, in a completely different application, namely seawater fishkeeping/aquarism, a hydraulic pump is known having a propulsion-effect impeller and provided with an electric motor that is fed with DC and designed to be sealed, as disclosed in Publication DE 20 2005 021 216 U1. That hydraulic pump is designed to be immersed in a seawater aquarium and serves to mix the water contained in the aquarium for the purposes of bringing it up to the surface and of oxygenating it by bringing it into contact with the air on the surface. The technology of that brushless motor makes it possible to immerse it in a salty environment without any risk of its electrical and magnetic portions being corroded. However, its design is such that its rotor is mounted to move axially on the guide pin towards the outlet of the casing, so that if the rotation of the rotor is reversed erroneously, it moves axially, exits partially from the casing, and partially leaves the stator, thereby resulting in it stopping. Thus, that electric motor is not adapted to the application for which the invention is designed and for which the hydraulic pump has to operate in suction rather than in propulsion. Indeed, the suction force exerted axially on the rotor would inevitably generate magnetic decoupling of the rotor relative to the stator, making it impossible for the hydraulic pump to operate and for any attempt at filtering the water in the pool to succeed.

SUMMARY OF THE DISCLOSURE

An object of the present invention is to mitigate those drawbacks by proposing a filtration method for filtering the water in a pool, in particular a swimming pool, which method implements a centrifugal hydraulic pump that is safe, silent, reliable, durable, without requiring maintenance or having wearing parts that need to be changed, discreet and fully incorporatable into the deck surrounding the pool, of low electrical power, and therefore of low energy consumption, for improved efficiency and improved effectiveness, it being possible for the pump to be powered with very low voltage coming from renewable electrical energy such as, for example, solar energy and/or wind energy, the pump further making it possible to obviate the need for any dedicated cooling circuit, and being easy to implement and to incorporate into a new or existing filtration unit, while remaining easily accessible, and while limiting the risk of cavitation.

To this end, the invention provides a filtration method of the type indicated in the introduction, characterized in that said centrifugal hydraulic pump is mounted in the upper portion of said at least one filtration unit, in such a manner as to be fully incorporated into a water feed corridor that is substantially horizontal and open towards said pool via said suction intake, so that said centrifugal hydraulic pump is easily accessible from the top of said filtration unit, and so that said electric motor of said pump is partially or fully immersed in the water that is flowing along said water feed corridor, so that said electric motor is cooled and sound-proofed automatically by the water flowing through said filtration unit.

Preferably, an electric motor is used that has a rotor having one or more permanent magnets driven in rotation by a rotating field generated by a stator provided with excitation windings, electrical powering of which is controlled autonomously by an electronic circuit, said rotor and said stator each being encapsulated in a synthetic material forming a sealing and insulating resin that withstands chlorinated water and saltwater.

Advantageously, the stator of said electric motor is packaged in a casing, said casing is manufactured with an upper flange made integrally in one piece with it, said pump body is manufactured integrally in one piece with a lower flange, and said electric motor is assembled to said pump body and to said filtration unit via their respective lower and upper flanges.

In the preferred embodiment of the invention, the centrifugal turbine is mounted on a lower end of the rotor that projects from the casing, and the axial position of the rotor between an upper bearing and a lower bearing is locked to guarantee said motor is properly magnetically aligned with said stator. Similarly, said rotor is guided in rotation by an axial guide pin that is fastened to the casing and that serves as a smooth bearing.

Advantageously, said electric motor may be caused to rotate at a substantially constant speed of less than 2900 rpm, commonly encountered in asynchronous motors, and preferably of less than 2000 rpm, for generating a flow-rate of water lying in the range 4 cubic meters per hour ($m^3/h$) to 12 $m^3/h$ as a function of the operating point of said centrifugal hydraulic pump. It is even possible to determine the operating point of said centrifugal hydraulic pump as a function of the volume of water contained in the pool by parameterizing the speed of rotation of said electric motor in the factory.

Depending on the design of the filtration unit, it is possible to dispose said centrifugal hydraulic pump downstream from said at least one filtration device.

Very advantageously, the total annual electricity consumption of said centrifugal hydraulic pump may be covered by the annual generation from a renewable electrical energy source. By way of example, the annual generation from two photovoltaic panels of a maximum of 250 W peak each may be used as a renewable electrical energy source.

The invention also provides a filtration unit making it possible to implement the above-defined filtration method, and a centrifugal hydraulic pump arranged to equip said filtration unit, said filtration unit and said centrifugal hydraulic pump being characterized in that said centrifugal hydraulic pump is arranged to be mounted in the upper portion of said filtration unit in such a manner as to be fully incorporated into a water feed corridor that is substantially horizontal and open towards said pool via said suction intake, so that said centrifugal hydraulic pump is easily accessible from the top of said filtration unit, and so that said electric motor of said pump is partially or fully immersed in the water that is flowing along said water feed corridor, so that said electric motor is cooled and sound-proofed automatically by the water flowing through said filtration unit.

Said centrifugal turbine is advantageously installed at a level lower than the level of the floor of the water feed corridor so as to be under load permanently, thereby facilitating instantaneous priming of said pump.

In addition, the electronic circuit of the electric motor may be parameterized in the factory to determine a speed of rotation adapted to suit the volume of water contained in the pool, thereby also making it possible to adapt the energy consumption of said centrifugal hydraulic pump as closely as possible.

In a preferred embodiment of the invention, the pump has two half-shells between which said centrifugal turbine rotates, at least one axial inlet and at least one radial outlet, which inlet(s) and outlet(s) are designed to communicate respectively with said suction intake and with said delivery orifice of said filtration unit, it being possible for said centrifugal turbine to be an "open" turbine provided with radial vanes carried by a single diffuser plate.

In addition, said diffuser plate may be provided with at least one hole forming a passageway for enabling fluid to pass through towards said guide pin, which is advantageously made of a material that withstands corrosion.

The invention also provides a pool of water, in particular a swimming pool, said pool having at least one filtration unit arranged to implement the above-defined filtration method so as to form a pool having low energy consumption.

BRIEF DESCRIPTION OF THE DRAWINGS

The present invention and its advantages appear more clearly from the following description of an embodiment given by way of non-limiting example, with reference to the accompanying drawings, in which:

FIG. 1 is a perspective view of a filtration unit of the invention as adjoining a vertical wall of a pool;

FIG. 2 is a perspective view of the filtration unit of FIG. 1 before it is assembled with the wall of said pool;

DETAILED DESCRIPTION

In the embodiments shown, elements or portions that are identical from one figure to another bear like reference numbers.

Figure 3:
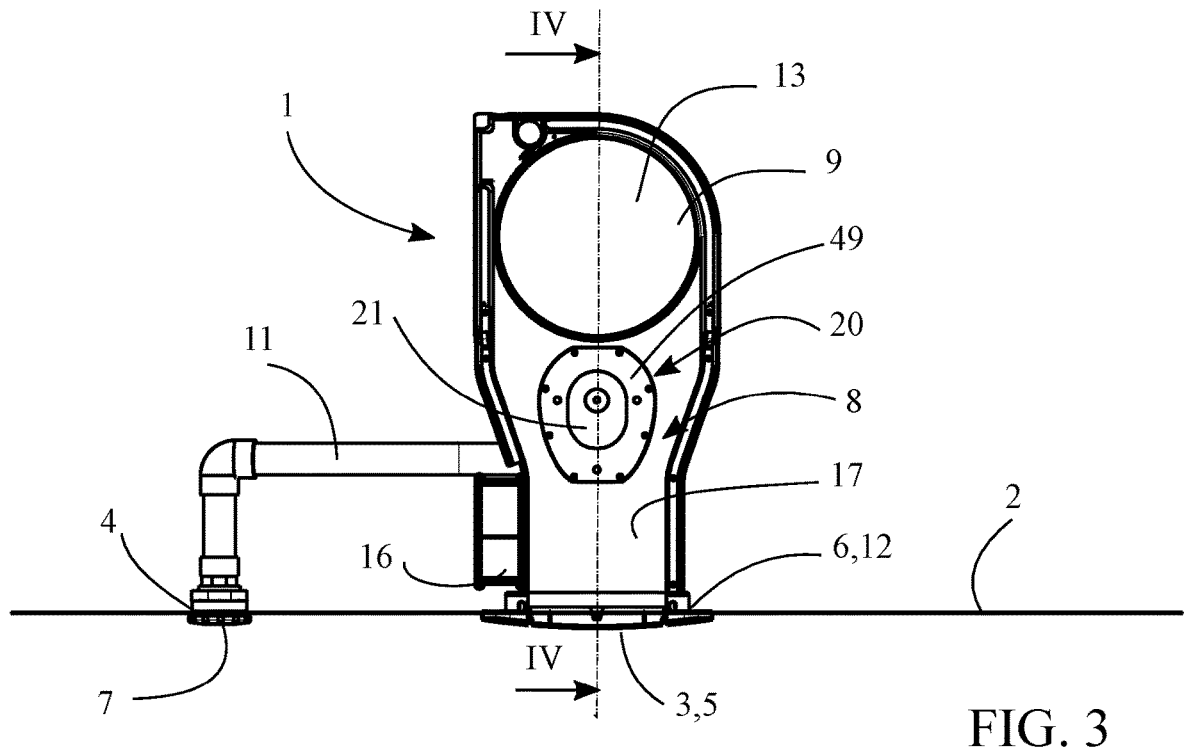
FIG. 3 is a view from above of the filtration unit of FIG. 1.
Figure 4:
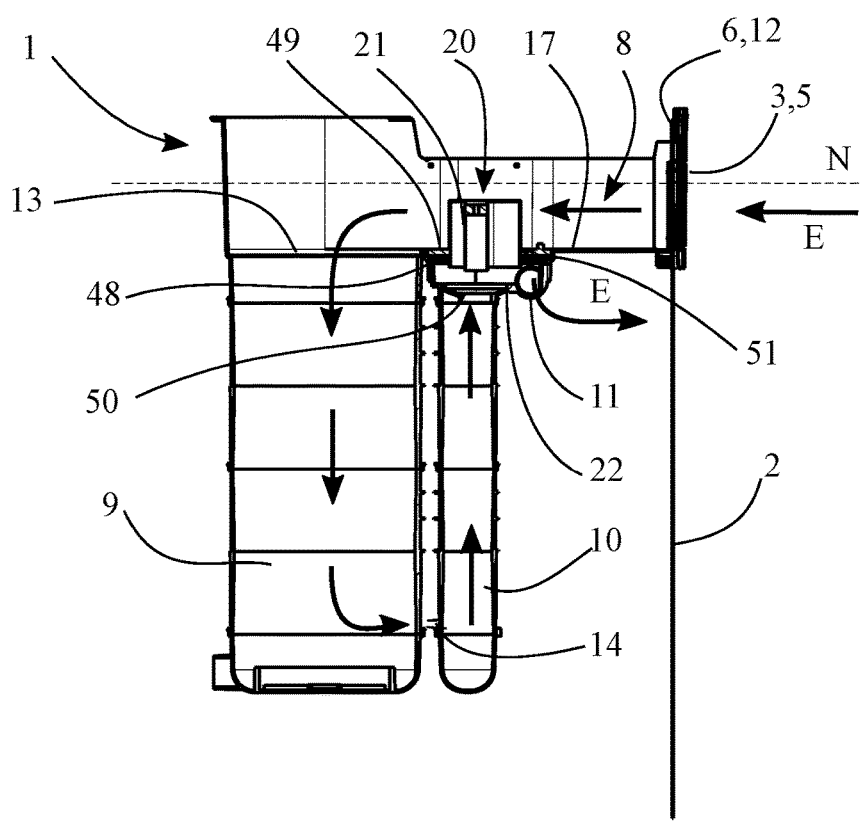
FIG. 4 is an axial section view on the axis IV-IV through the filtration unit of FIG. 3.

With reference to FIGS. 1 to 4, the filtration unit 1 of the invention is designed to clear the water contained in the pool of any solid particles coming from the environment outside the pool, and from users of it, and to diffuse the disinfection product(s). To this end, it is designed to be assembled to the back of a wall 2 of a pool (not shown). The terms "pool" or "basin" are used to mean any water container for fun learning, recreational, well-being, or therapeutic uses, such as a swimming pool, a Jacuzzi or spa bath, a diving pool, or other similar pools or baths, without these examples being limiting. The wall 2 is preferably a vertical or substantially vertical peripheral wall of the pool. In the example shown, the filtration unit 1 adjoins the back face of the wall 2 of the pool, but it could be remote and housed in a plant room, for example. The advantage of mounting the filtration unit 1 such that it adjoins the pool lies in the fact that the lengths of the ducts and pipes of the hydraulic circuit are then reduced, the effect being to limit the head losses and the risk of leakage. In order to enable hydraulic communication between the pool and the filtration unit 1, the wall 2 of the pool is provided with a suction opening 3 that is situated in the upper portion, and preferably at least partially immersed below the level N of the water contained in the pool, and a delivery orifice 4 that is situated in the vicinity of the suction opening 3, and preferably fully immersed under the water level N. The suction opening 3 is limited by a pivotally mounted flap 5 or the like for acting, while the pump is operating, to generate a water blade that accelerates the speed of suction, thereby facilitating surface skimming. The filtration unit 1 has a hydraulic circuit extending from a suction intake 6 to a delivery fitting 7 while going through a centrifugal hydraulic pump 20, referred to below as the "pump 20", so as to generate a forced flow of water from and back into the pool that is indicated symbolically by arrows E shown in FIGS. 1 and 4. The hydraulic circuit also has a water feed corridor 8, a filtration tank 9 containing one or more filtration devices (not shown), a suction column 10, and a delivery pipe 11. The water feed corridor 8 is substantially horizontal, it is open towards the pool via the suction intake 6 that is fastened to the wall 2 of the pool in alignment with its suction opening 3 via a sealing gasket 12 or the like. The water feed corridor 8 opens out into the filtration tank 9 that is of substantially vertical axis via an axial opening 13. The filtration device(s) contained in the filtration tank 9 have filtration media of known type, such as sand of different grain sizes, active charcoal, textile filters, and the like, packaged in filter pockets or filter cartridges that are interchangeable. The filtration tank 9 communicates with the suction column 10 via a radial pipe 14 in the lower portion (FIG. 4). The suction column 10 of substantially vertical axis, extends parallel to the filtration tank 9 and opens out into the delivery pipe 11. The delivery pipe 11 is substantially horizontal and is terminated by the delivery fitting 7 that is fastened via a sealing gasket (not shown) into the delivery orifice 4 in the wall 2 of the pool. In the example shown, the pump 20 is disposed downstream from the filtration tank 9, and more exactly between the suction column 10 and the delivery pipe 11, i.e. in the upper portion of the filtration unit 1. Thus, the pump 20 is protected from any risk of clogging. Should the filtration device(s) provided in the filtration tank 9 fail, the particular architecture of the centrifugal turbine 23 (open architecture) enables the impurities to be removed automatically, and thus protects the pump 20 from any risk of clogging. Naturally, this configuration is not exclusive, and the pump 20 could be disposed upstream from the filtration tank 9. Operation of the pump 20 generates negative pressure in the suction column 10 and then in the filtration tank 9, the effect of this suction being to suck water in from the surface of the pool via the suction opening 3 and the suction intake 6 by opening the pivotally mounted flap 5 to generate a forced flow E of the sucked-in water through the filtration device(s) contained in the filtration tank 9 before delivering it back into the pool once it has been cleared of all of its solid particles, such as leaves, insects, sand, etc.

As shown in these figures, and in particular in FIG. 4, the pump 20 of the invention is disposed in the upper portion of the filtration unit 1, in such a manner as to be fully incorporated into the water feed corridor 8, and as to be fully immersed in the water that is flowing along said corridor. Naturally, it may be only partially immersed. The water feed corridor 8 is closed off by a removable cover 15 that may be flat and entirely incorporated into the plane of the deck around the pool without any protruding portion (FIG. 1). The cover 15 may easily be adapted to suit the appearance of the deck of the pool and, for example, include a coping if the deck has a coping. The filtration unit 1 also has a connection box 16 containing the connection terminals for interconnecting an electrical power source and the electric motor 21 that equips the pump 20.

Figure 5:
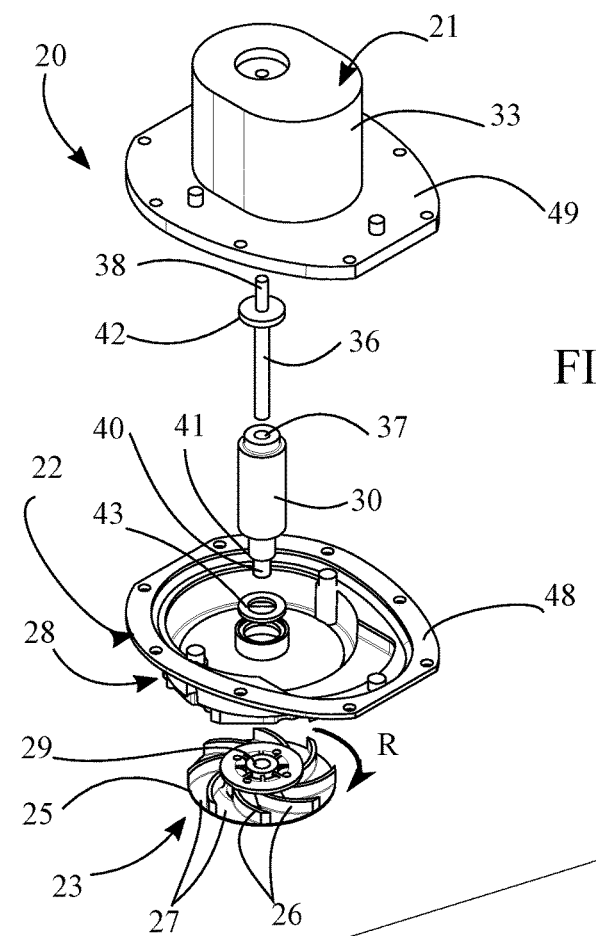
FIG. 5 is an exploded view of a centrifugal hydraulic pump of the invention that is part of the filtration unit of FIGS. 1 to 4.
Figure 6:
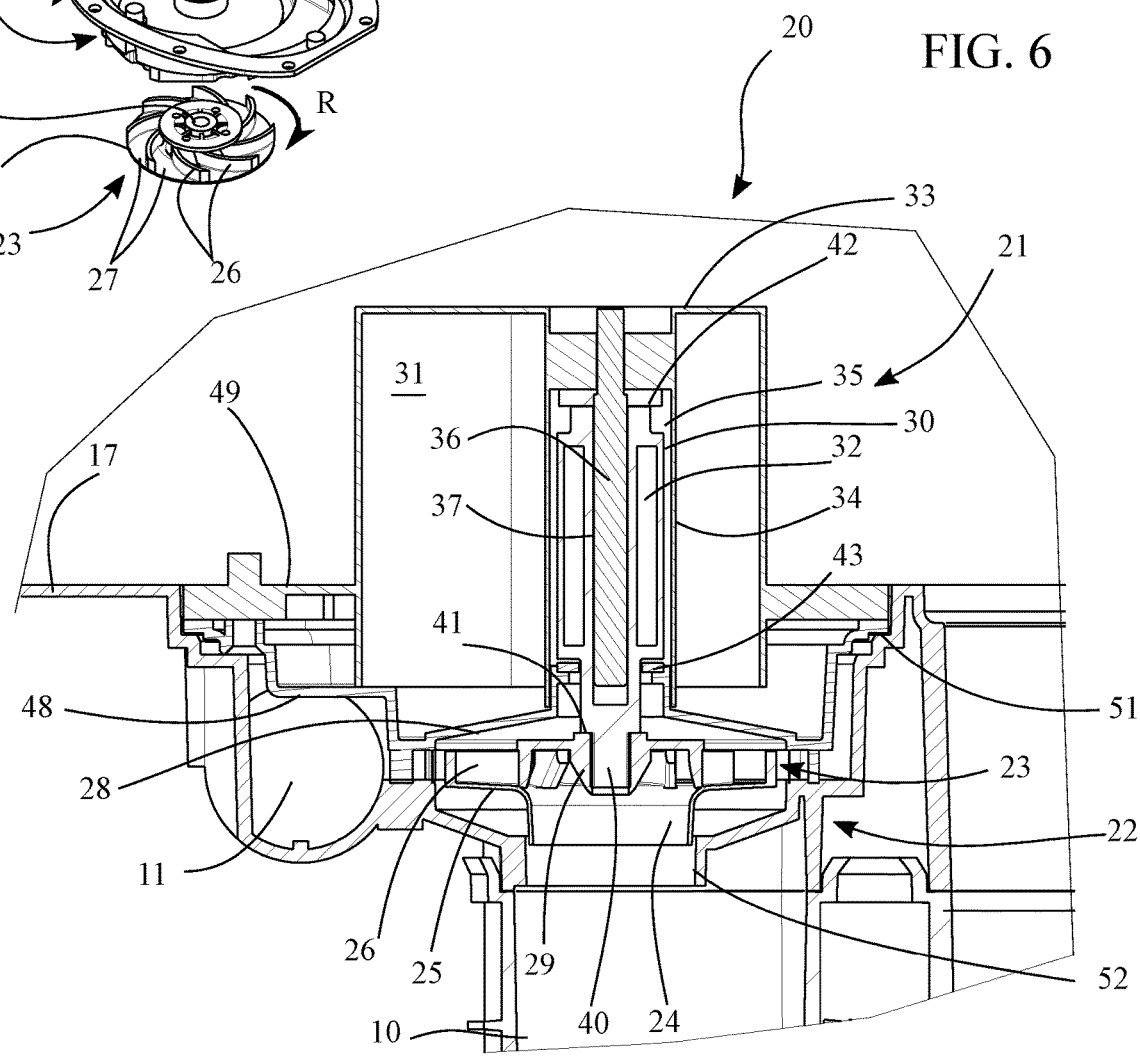
FIG. 6 is an axial section view through the centrifugal hydraulic pump of FIG. 5 as assembled and mounted in the filtration unit.
Figure 7:
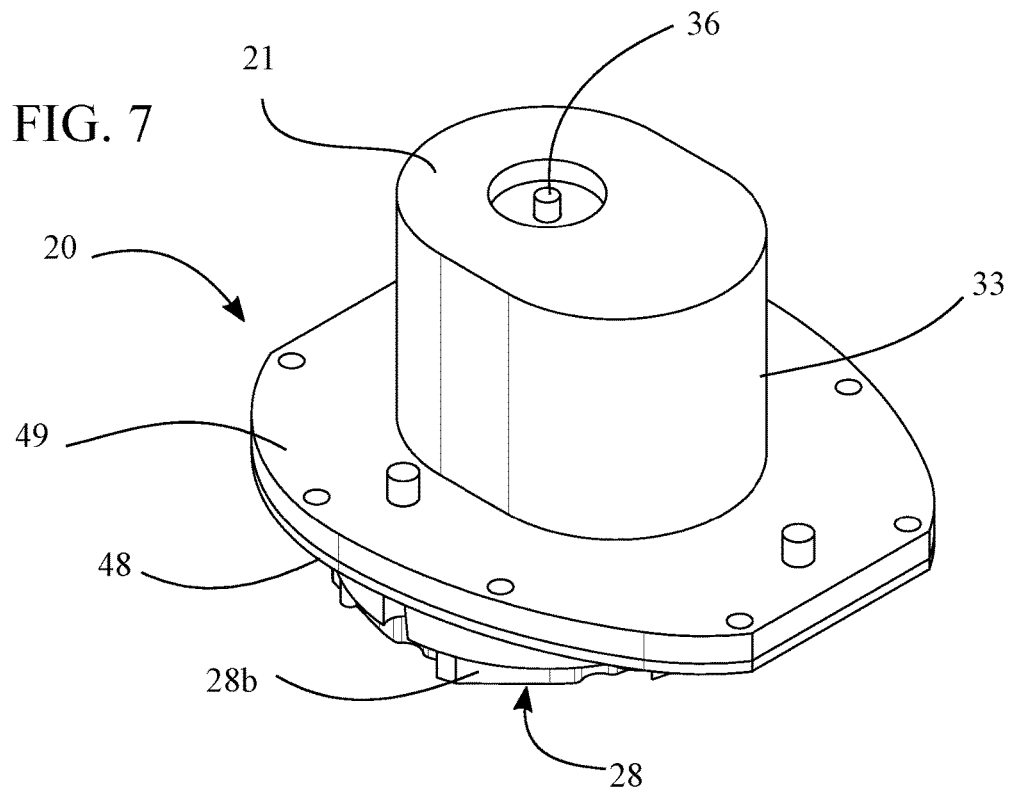
FIG. 7 is a perspective view of the centrifugal hydraulic pump of FIG. 6.

The pump 20 of the invention is described more particularly with reference to FIGS. 5 to 8. It has an electric motor 21 and a pump body 22 in which a centrifugal turbine 23 is housed that is coupled to the transmission shaft of said motor so as to be driven in rotation in a direction in which it generates suction of the water, the direction of rotation being clockwise in the example shown, as indicated by arrow R (FIG. 5). The centrifugal turbine 23 is installed under the floor 17 of the water feed corridor 8, which floor corresponds to the water level that is the lowest admissible in the filtration unit 1. As a result, the turbine is always under load, and the pump 20 is primed instantly and automatically. The centrifugal turbine 23 has an axial suction mouth 24 provided in a diffuser plate 25 (FIG. 6). The diffuser plate 25 carries curved radial vanes 26 that define suction channels 27 between them (FIG. 5) that extend from the axial suction mouth 24 towards a diffuser 28 and towards a radial delivery mouth (not shown in the figures) that communicates with the delivery pipe 11 (FIG. 6). The centrifugal turbine is said to be an "open" centrifugal turbine since its radial vanes 26 are not enclosed between two diffuser plates. It is thus self-cleaning, which can be an advantage in the event of malfunctioning of the filtration device, as mentioned above, and it has a wide range of flow rates for any given motor power. The centrifugal turbine 23 also includes a central hub 29 for coupling to the transmission shaft of the electric motor 21 (FIG. 6). Naturally, any other suitable type of equivalent centrifugal turbine may be used. The diffuser plate 25 of the centrifugal turbine 23 and/or the diffuser 28 of the pump body 22 may also be provided with one or more holes (not shown) making it possible to achieve improved pressure build-up in the central portion 28a, 54a of the pump body 22, and thus improved lubrication of the guide pin 36.

The electric motor 21 is preferably a sealed, DC, autonomously controlled, brushless electric motor. The technology of the motor 21 may correspond to the technology disclosed in part in Publication DE 20 2005 021 216 U1, without that example being limiting. As shown more particularly in FIGS. 5 and 6, it has a rotor 30 and a stator 31, the rotor 30 having one or more permanent magnets 32 for being driven in rotation by a rotating field generated by the stator 31. For this purpose, the stator 31 has excitation windings (not shown) powered by an electronic circuit that serves to switch the electrical powering between the excitation windings to generate said rotating field. The casing 33 is provided with a through bore forming an axial cavity 34 for housing the rotor 30 with clearance relative to the stator 31 that defines a peripheral airgap 35. The casing 33 is filled with a synthetic material forming a sealing and insulating resin, in which the excitation windings of the stator 31 are encapsulated. This filler material makes it possible to hold the excitation windings relative to one another, to dissipate the heat given off by Joule effect, and also to protect the stator 31 as a whole from humidity and moisture. The casing 33 may also be made of such an insulating and sealing material, or of any other equivalent material. The rotor 30 is made of a synthetic material forming an insulating and sealing resin in which the permanent magnets 32 are encapsulated. This filler material makes it possible to hold the permanent magnets relative to one another, to dissipate the heat given off by Joule effect, and also to protect the rotor 30 from humidity and moisture. The rotor 30 is guided in rotation by an axial guide pin 36, assembled and fastened to the casing 33 by any appropriate fastening means. The lower end 40 of the rotor 30 projects from the casing 33 at the end in the vicinity of the pump body 22 so as to form a transmission shaft that is constrained to rotate with the centrifugal turbine 23 by any appropriate fastening means and, for example, by screw-fastening. The centrifugal turbine 23 is positioned axially relative to the rotor 30 by means of a shoulder 41 that delimits said lower end 40. The rotor 30 is positioned axially relative to the stator 31 by means of two bearings 42, 43, namely an upper bearing 42 disposed between the rotor 30 and the casing 33, and a lower bearing 43 disposed between the rotor 30 and a lower flange 48 of the pump body 22. Through this particular construction, the rotor 30 is prevented from moving axially and its magnetic alignment with the stator 31 is guaranteed regardless of the suction force exerted by the centrifugal turbine 23. The materials of which the rotor, 30, the bearings 42, 43, and the guide pin 26 are made are chosen to guarantee axial and radial guiding of the rotor 30 without ball bearings, solely by friction with a low coefficient of friction, thereby guaranteeing that the guide means are insensitive to the chlorinated or salty ambient environment of the water in the pool. By way of example, the guide pin 36 and the bearings 42, 43 are made of stainless steel or of titanium, while the rotor 30 is made of a thermoplastic synthetic material, such as acrylonitrile styrene acrylate (ASA), polyoxymethylene (POM), a polyamide (PA6.6) or the like, with or without additive, enriched with a fluorinated material such as Teflon that limits friction.

The casing 33 is secured to an upper flange 49 that is preferably made integrally in one piece with the casing 33 during manufacture of said casing by molding a plastics material. The pump body 22 has a lower flange 48 in register with the upper flange 49 of the casing 33. The lower and upper flanges 48, 49 extend substantially in planes perpendicular to the axis of the electric motor 21, and make it possible to assemble said motor 21 to the pump body 22 and to the filtration unit 1 simultaneously, by using any type of suitable fastening means making it possible to achieve assembly that is reversible, i.e. disassemblable. The pump body 22 has two half-shells, namely an upper half-shell incorporated in the lower flange 48 and a lower half-shell incorporated in a dish 50. The dish 50 is positioned at the top of the suction column 10 (FIG. 4) at a level situated under the floor 17 of the water feed corridor 8, and forming a seat 51 for receiving the pump 20 (FIG. 6). The dish 50 has an axial inlet 52 (FIG. 6) putting the axial suction mouth 24 of the centrifugal turbine 23 into communication with the suction column 10, and a radial outlet (not shown) putting the suction channels 27 of the turbine 23 into communication with the delivery pipe 11 of the filtration unit 1 that opens out into the pool via the delivery orifice 4 (FIG. 4). The pump 20 is centered in the dish 50 provided in the upper portion of the suction column 10 and is integrally fastened to the filtration unit 1. The fastening means used are reversible so that they are easy to remove and to put back if necessary.

Figure 8:
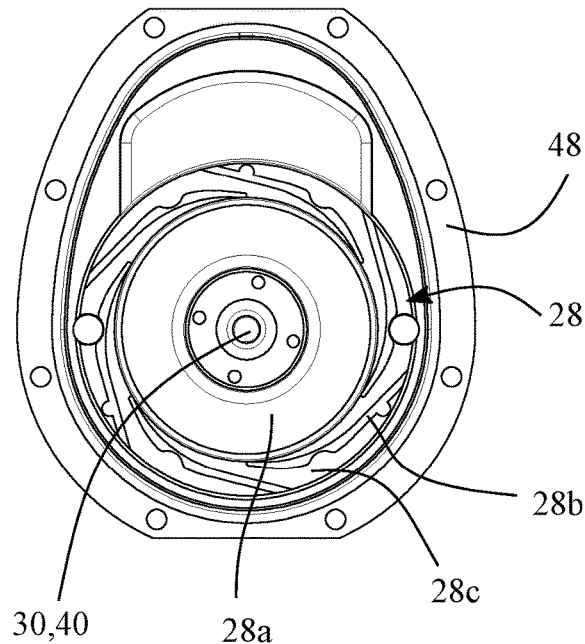
FIG. 8 is a view from below of the centrifugal hydraulic pump of FIG. 7, without its centrifugal turbine.
Figure 9:
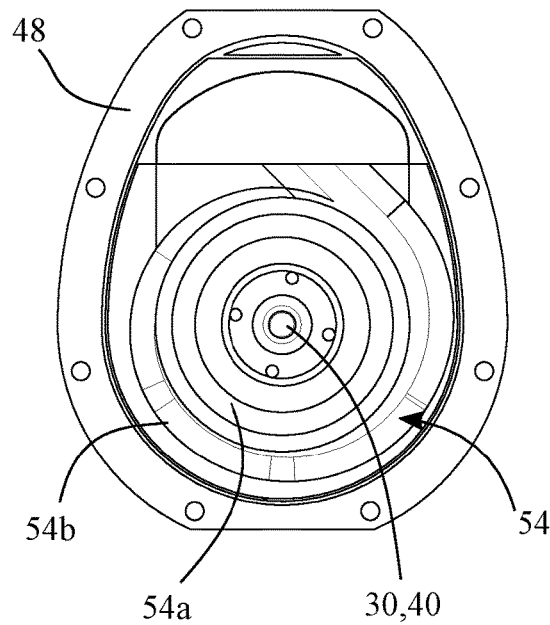
FIG. 9 is a view from below of a variant of the centrifugal hydraulic pump of FIG. 7, without its centrifugal turbine.

Depending on the technology chosen for the pump 20, the pump body 22 may co-operate with the centrifugal turbine 23 to define a diffuser 28, as shown in FIGS. 5 to 8, or to define a volute 54, as shown in FIG. 9, the effect of which is to transform the kinetic energy of the fluid into potential energy. With reference to FIG. 8, the diffuser 28 is provided in the lower wall of the lower flange 48 of the pump body 22, which wall is situated facing the radial vanes 26 of the centrifugal turbine 23, and said diffuser 28 has a conical central portion 28a in register with which said centrifugal turbine 23 rotates, and a peripheral portion provided with radial vanes 28b inclined in the same orientation configuration as or in an orientation configuration similar to the radial vanes 26 of the centrifugal turbine 23, providing delivery channels 28c between them so as to direct the fluid towards the delivery pipe 11 via the radial outlet of the dish 50. The conical central portion 28a of the diffuser may be provided with one or more through holes for facilitating lubrication of the guide pin 36. With reference to FIG. 9, the volute 54 is provided in the lower wall of the lower flange 48 of the pump body 22, which wall is situated facing the radial vanes 26 of the centrifugal turbine 23, and said volute 54 has a substantially plane central portion 54a in register with which said centrifugal turbine 23 rotates, and a peripheral spiral 54b for directing the fluid towards the delivery pipe 11 via the radial outlet of the dish 50.

The electric motor 21 is advantageously fed with direct current at a very low voltage (VLV), e.g. in the range 12 VDC to 30 VDC, and in compliance with the applicable regulations. The power cable (not shown) of the electronic circuit for controlling the electric motor 21 is sheathed to be completely isolated and to withstand permanent immersion. It passes through the casing 33 via an opening (not shown) provided with a sealing gasket such as a packing gland (not shown), e.g. in the upper portion of the casing 33 so as to be easily accessible and easily connected to an electrical power supply source via the connection box 16. This electric motor 21 has the specificity of consuming very little power, of about 150 watt-hours (Wh), i.e. in the range three times less to six times less than an asynchronous motor conventionally used for this application. It can thus be powered exclusively by a renewable electrical energy source, such as, by way of example, solar energy or wind energy. More particularly, its annual consumed power may be covered exclusively by the annual electricity generation from a renewable energy source, such as, by way of example, two photovoltaic panels of a maximum of 250 W peak each. Naturally, this example is not limiting, and extends to any other renewable energy source. The motor may also be powered by the available electricity network. The efficiency of this type of motor is very good, and approximately in the range 70% to 90%, i.e. more than double the efficiency of conventionally used asynchronous motors. Similarly, its speed of rotation is low, e.g. less than 2900 rpm and preferably less than 2000 rpm, corresponding to a frequency of about 33 Hz, reduced by about one third relative to those of asynchronous motors conventionally used for the application of the invention, without these values being limiting. This slower speed of rotation makes it possible advantageously to increase the efficiency of the mechanical to hydraulic conversion of the pump 20 and to avoid cavitation phenomena while preserving a high electrical efficiency. The frequency of rotation of the electric motor 21 is adaptable for modifying the consumption of the pump 20 or its flow rate. In particular, the pump 20 may be calibrated in the factory to be adjusted, to the nearest cubic meter, to suit the size of the pool, and thus satisfy the needs of the customer as closely as possible. Once programmed, the speed of rotation of the motor 21 remains constant. Being able to program in the factory the operating conditions for the motor 21 makes it possible, using one and the same design for the motor 21, to create a range of pumps 20 having their flow rates and energy consumptions adapted to suit the volume of the pool to be filtered. In addition, and by means of the technology of the electric motor 31 used, the pump 20 of the invention is capable of operating at a dynamic head of at least 4 meters (m). This operating characteristic guarantees that the water in the pool flows through the filtration unit 1 even when the filtration device is clogged, thereby procuring additional safety.

The novel technology of the filtration unit 1 of the invention thus offers a solution that is very economical with energy, which can be self-generated, and that offers much higher performance technically. Thus, the filtration unit 1 and the pool it equips may be said to be "low energy consumption" or "low carbon emission". The term "low energy consumption" designates a product for which the energy consumption necessary for causing it to operate is significantly reduced compared with standard products. If the product is a low energy consumption product then, implicitly, it generates less carbon emissions.

Furthermore, the design of this electric motor 21, without any wearing part and rendered completely sealed, and in particular waterproof, by being made of synthetic materials that are compatible with the saltwater or chlorinated water in the pool, guarantees at least 28,000 hours of operation without any maintenance work, which is equivalent to it being used for about 10 years under normal conditions of use of the pool.

The filtration method of the invention advantageously makes it possible to filter the water of a pool by means of the pump 20 that is accessible from the top of the filtration unit 1, and that is partially or fully immersed below the level of the water N in the pool, by means of its electric motor 21 that can be partially or fully immersed in the water flowing along the water feed corridor 8 of the filtration unit 1. The term "accessible" means that an operative or a user can access the pump 20 quickly and easily by removing the cover 15, and without having to disassemble the entire filtration unit 1 as is necessary in the prior art. The level N of the water contained in the pool and in the filtration unit 1 is indicated symbolically by a line of short dashes in FIGS. 1, 2 and 4. This novel configuration in which the pump 20 and its electric motor 21 are disposed in the upper portion of the filtration unit 1 offers numerous advantages. Indeed, the water flowing under forced flow along the water feed corridor 8 makes it possible to remove automatically the heat given off by Joule effect by the electric motor 21, and thus to cool said motor naturally and automatically without needing to provide a specific cooling circuit as in the prior art. Furthermore, the operating noise of the electric motor 21 is masked by the water, which acts as a noise barrier and procures natural sound-proofing for said motor 21. In addition, since the technology of said electric motor 21 is completely sealed, brushless, and bearing-free, it protects said motor from attack from the water in the pool, thereby guaranteeing lasting and reliable operation over a period of at least 10 years, as against from 3 years to 5 years with the technology of the asynchronous motors conventionally used for the application of the invention. The present invention also makes it possible to use the pump 20 in a pool that is fed with saltwater, whereas this is not possible with the prior art pump, in which the portions in contact with the water, and that are not all made of stainless steel or of some other non-corrodible material, are corroded under the action of the salt. Furthermore, the pump 20 and its electric motor 21 are very easy to install in the filtration unit 1 and remain accessible from the top of the filtration unit 1 after the cover 15 has been removed, without having to disassemble the filtration unit 1. Thus, the cleaning, maintenance, and disassembly operations for winterizing are greatly simplified.

The present invention is not limited to the embodiments and implementations described, but rather it extends to any modification and variant obvious to the person skilled in the art.

The invention claimed is:

1. A filtration method for filtering water in a swimming pool, in which method a forced flow of water is generated so that water is caused to flow from and back into the pool through at least one filtration unit having at least one suction intake, and at least one delivery orifice, said at least one filtration unit having a centrifugal hydraulic pump and at least one filtration device, said centrifugal hydraulic pump having an electric motor coupled to a centrifugal turbine housed in a pump body, and said electric motor being a sealed, brushless, autonomously controlled motor fed with direct current at very low voltage of in the range 12V to 30V, wherein said centrifugal hydraulic pump is mounted in the upper portion of said at least one filtration unit, in such a manner as to be fully incorporated into a water feed corridor that is horizontal and open towards said pool via said suction intake, so that said centrifugal hydraulic pump is accessible from the top of said filtration unit, and so that said electric motor of said pump is partially or fully immersed in the water that is flowing along said water feed corridor, so that said electric motor is cooled and sound-proofed automatically by the water flowing through said filtration unit.

2. A filtration method according to claim 1, wherein the electric motor is used that has a rotor having one or more permanent magnets driven in rotation by a rotating field generated by a stator provided with excitation windings, electrical powering of which is controlled autonomously by an electronic circuit, and wherein said rotor and said stator are each encapsulated in a synthetic material forming a sealing and insulating resin that withstands chlorinated water and saltwater.

3. A filtration method according to claim 2, wherein the stator of said electric motor is packaged in a casing, wherein said casing is manufactured with an upper flange made integrally in one piece with said casing, wherein said pump body is manufactured with a lower flange made integrally in one piece with said pump body, and wherein said electric motor is assembled to said pump body and to said filtration unit via their respective lower and upper flanges.

4. A filtration method according to claim 3, wherein said centrifugal turbine is mounted on a lower end of said rotor that projects from said casing, and wherein an axial position of said rotor between an upper bearing and a lower bearing is locked to guarantee said rotor is magnetically aligned with said stator.

5. A filtration method according to claim 3, wherein said rotor is guided in rotation by an axial guide pin that is fastened to the casing and that serves as a bearing.

6. A filtration method according to claim 1, wherein said electric motor is caused to rotate at a constant speed of less than 2900 rpm, for generating a flow-rate of water lying in the range 4 $m^3/h$ to 12 $m^3/h$ as a function of an operating point of said centrifugal hydraulic pump.

7. A filtration method according to claim 6, wherein said operating point of said centrifugal hydraulic pump is determined as a function of the volume of water contained in the pool by parameterizing the speed of rotation of said electric motor in a factory.

8. A filtration method according to claim 1, wherein, in said at least one filtration unit, said centrifugal hydraulic pump is disposed downstream from said at least one filtration device.

9. A filtration method according to claim 1, wherein a total annual electricity consumption of said centrifugal hydraulic pump is covered by an annual generation from a renewable electrical energy source.

10. A filtration method according to claim 9, wherein the annual generation from two photovoltaic panels of a maximum of 250 W peak each is used as the renewable electrical energy source.

11. A filtration unit for implementing the filtration method for filtering water in a swimming pool, according to claim 1, said filtration unit having at least one suction intake and at least one delivery orifice in communication with said pool, a centrifugal hydraulic pump and at least one filtration device, said centrifugal hydraulic pump having an electric motor coupled to a centrifugal turbine housed in a pump body, said electric motor being a sealed, brushless, autonomously controlled motor fed with direct current at very low voltage of in the range 12V to 30V, wherein said centrifugal hydraulic pump is mounted in the upper portion of said at least one filtration unit, in such a manner as to be fully incorporated into a water feed corridor that is horizontal and open towards said pool via said suction intake, so that said centrifugal hydraulic pump is accessible from the top of said filtration unit, and so that said electric motor of said pump is partially or fully immersed in the water that is flowing along said water feed corridor, so that said electric motor is cooled and sound-proofed automatically by the water flowing through said filtration unit.

12. A filtration unit according to claim 11, wherein the centrifugal turbine is installed at a lower level than the level of a floor of the water feed corridor so as to be under load permanently.

13. A filtration unit according to claim 11, wherein said electric motor has a rotor having one or more permanent magnets driven in rotation by a rotating field, a stator provided with excitation windings and arranged to generate said rotating field, and an electronic circuit powered at the very low voltage and arranged to autonomously control the electrical powering of said excitation windings, said rotor and said stator each being encapsulated in a synthetic material forming a sealing and insulating resin that withstands chlorinated water and saltwater.

14. A filtration unit according to claim 13, wherein said stator has a casing provided with an upper flange, wherein said pump body has a lower flange, and wherein said electric motor and said pump body are assembled together and to said filtration unit via their respective lower and upper flanges.

15. A filtration unit according to claim 14, wherein said upper flange is formed integrally in one piece with said casing of a plastics material.

16. A filtration unit according to claim 14, wherein said centrifugal turbine is mounted on a lower end of said rotor that projects from said casing, and wherein said electric motor has an upper bearing disposed between said rotor and said casing, and a lower bearing disposed between said rotor and the lower flange of said pump body to lock an axial position of said rotor and to guarantee it is magnetically aligned with said stator.

17. A filtration unit according to claim 11, wherein said centrifugal hydraulic pump is disposed downstream from said at least one filtration device.

18. A centrifugal hydraulic pump for a filtration unit according to claim 11 for filtering water in a swimming pool, said centrifugal hydraulic pump having an electric motor coupled to a centrifugal turbine housed in a pump body, said electric motor being a sealed, brushless motor fed with direct current at very low voltage of in the range 12V to 30V, wherein said centrifugal hydraulic pump is arranged to be mounted in the upper portion of said filtration unit in such a manner as to be fully incorporated into a water feed corridor, and is arranged to be partially or fully immersed in the water that is flowing along said water feed corridor so that said electric motor is cooled and sound-proofed automatically by the water flowing through said filtration unit, wherein said electric motor has a rotor having a permanent magnet driven in rotation by a rotating field, a stator provided with excitation windings and arranged to generate said rotating field, and an electronic circuit powered at very low voltage and arranged to autonomously control the electrical powering of said excitation windings, said rotor and said stator being each encapsulated in a synthetic material forming a sealing and insulating resin that withstands chlorinated water and saltwater.

19. A centrifugal hydraulic pump according to claim 18, wherein said stator is housed in a casing provided with an upper flange, wherein said pump body has a lower flange, and wherein said electric motor and said pump body are assembled together by their respective lower and upper flanges being mutually superposed.

20. A centrifugal hydraulic pump according to claim 19, wherein the casing and the upper flange are formed integrally in one piece made of a plastics material.

21. A centrifugal hydraulic pump according to claim 19, wherein said centrifugal turbine is mounted on a lower end of said rotor that projects from said casing, and wherein said electric motor has an upper bearing disposed between said rotor and said casing, and a lower bearing disposed between said rotor and the lower flange of said pump body to lock the axial position of said rotor and to guarantee said rotor is magnetically aligned with said stator.

22. A centrifugal hydraulic pump according to claim 19, wherein said pump body has two half-shells between which said centrifugal turbine rotates, at least one axial inlet and at least one radial outlet, which inlet(s) and outlet(s) are designed to communicate respectively with said suction intake and with said delivery orifice of said filtration unit when said centrifugal hydraulic pump is mounted in said filtration unit.

23. A centrifugal hydraulic pump according to claim 19, wherein said rotor is guided in rotation by an axial guide pin that is fastened to said casing and that serves as a bearing.

24. A centrifugal hydraulic pump according to claim 23, wherein said guide pin is made of a material that withstands corrosion.

25. A centrifugal hydraulic pump according to claim 18, wherein the centrifugal turbine is an "open" turbine that is provided with radial vanes carried by a single diffuser plate.

26. A centrifugal hydraulic pump according to claim 25, wherein the diffuser plate and/or the diffuser are provided with at least one hole forming a passageway for enabling fluid to pass through towards the guide pin.

27. A centrifugal hydraulic pump according to claim 18, wherein a dynamic head of said centrifugal hydraulic pump is at least 4 m.

28. A centrifugal hydraulic pump according to claim 18, wherein the electronic circuit of said electric motor is parameterizable in the factory to determine a speed of rotation adapted to suit the volume of water contained in the pool.

29. A swimming pool, having at least one filtration unit that communicates with said pool via at least one suction intake and via at least one delivery orifice, and that is arranged to generate a forced flow of water from and back into the pool through said filtration unit, which has a centrifugal hydraulic pump and at least one filtration device, said centrifugal hydraulic pump including an electric motor coupled to a centrifugal turbine housed in a pump body, wherein said filtration unit is arranged to implement the filtration method according to claim 1, and wherein said centrifugal hydraulic pump is fully incorporated in a water feed corridor that is horizontal and open towards said pool via said suction intake so that said centrifugal hydraulic pump is accessible from the top of said filtration unit and so that said electric motor of said pump is partially or fully immersed in the water that is flowing along said water feed corridor so that said electric motor is cooled and soundproofed automatically by the water flowing through said filtration unit.

* * * * *